United States Patent
Konstant

(12) 
(10) Patent No.: US 6,186,725 B1
(45) Date of Patent: *Feb. 13, 2001

(54) CONTAINER PICK AND RETURN SYSTEM

(75) Inventor: Anthony N. Konstant, Winnetka, IL (US)

(73) Assignee: Konstant Products, Inc., Skokie, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/318,362

(22) Filed: May 25, 1999

(51) Int. Cl.⁷ .............................. B65G 1/08; B65G 13/00
(52) U.S. Cl. ..................... 414/276; 414/286; 211/151; 211/162; 193/36
(58) Field of Search .................................. 414/266, 267, 414/276, 286; 211/134, 151, 162; 193/35 A, 35 R, 36, 37; 248/128, 133, 138, 139, 140

(56) References Cited

U.S. PATENT DOCUMENTS

| | | | |
|---|---|---|---|
| 4,485,910 | * 12/1984 | Tabler | 414/286 X |
| 4,613,270 | * 9/1986 | Konstant et al. | 414/276 |
| 5,224,828 | * 7/1993 | Lawless et al. | 193/35 A |
| 5,567,103 | 10/1996 | Konstant | 414/276 |
| 5,617,961 | * 4/1997 | Konstant et al. | 414/276 X |
| 5,642,976 | 7/1997 | Konstant | 414/276 |
| 5,735,661 | * 4/1998 | De Frondeville et al. | 414/276 |
| 5,873,473 | * 2/1999 | Pater | 414/276 X |

OTHER PUBLICATIONS

Creative Storage Systems, Inc. Kennesaw, GA, "Roll N'Lift" Mar. 1997, pp. 1–7 and attachments.

* cited by examiner

Primary Examiner—Robert P. Olszewski
Assistant Examiner—Gerald J. O'Connor
(74) Attorney, Agent, or Firm—Niro, Scavone, Haller & Niro

(57) ABSTRACT

A container pick and return system is provided having a two-tiered flow rail conveyor system that includes an inclined upper set of feed flow rails forming an input conveyor assembly and a lower set of inclined return flow rails forming an exit conveyor upon which a unit load may roll. At the front end of the system is a transfer conveyor assembly that, upon receipt of a loaded container, automatically and smoothly positions the container at an angle increased from the input conveyor assembly to enhance the accessibility of the contents of the container. When the container is emptied by the line worker, the transfer conveyor assembly is triggered and the empty container is automatically lowered and transferred to the exit conveyor where it rolls down the exit conveyor to the rear of the system for reloading. Upon transfer of the empty container, the transfer conveyor assembly automatically returns to an upper position for receipt of another loaded container and subsequent angular presentation of the contents of the container.

5 Claims, 18 Drawing Sheets

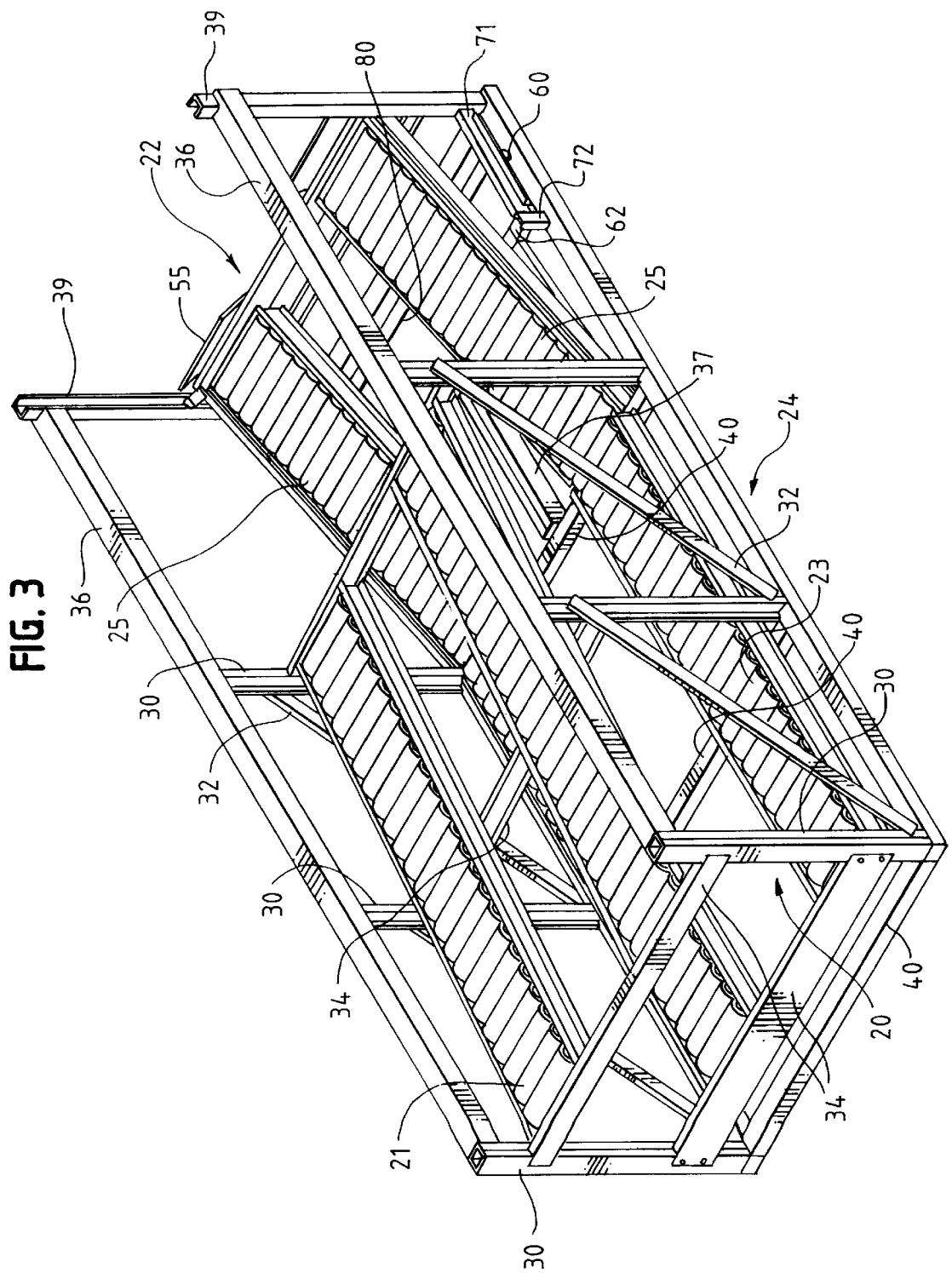

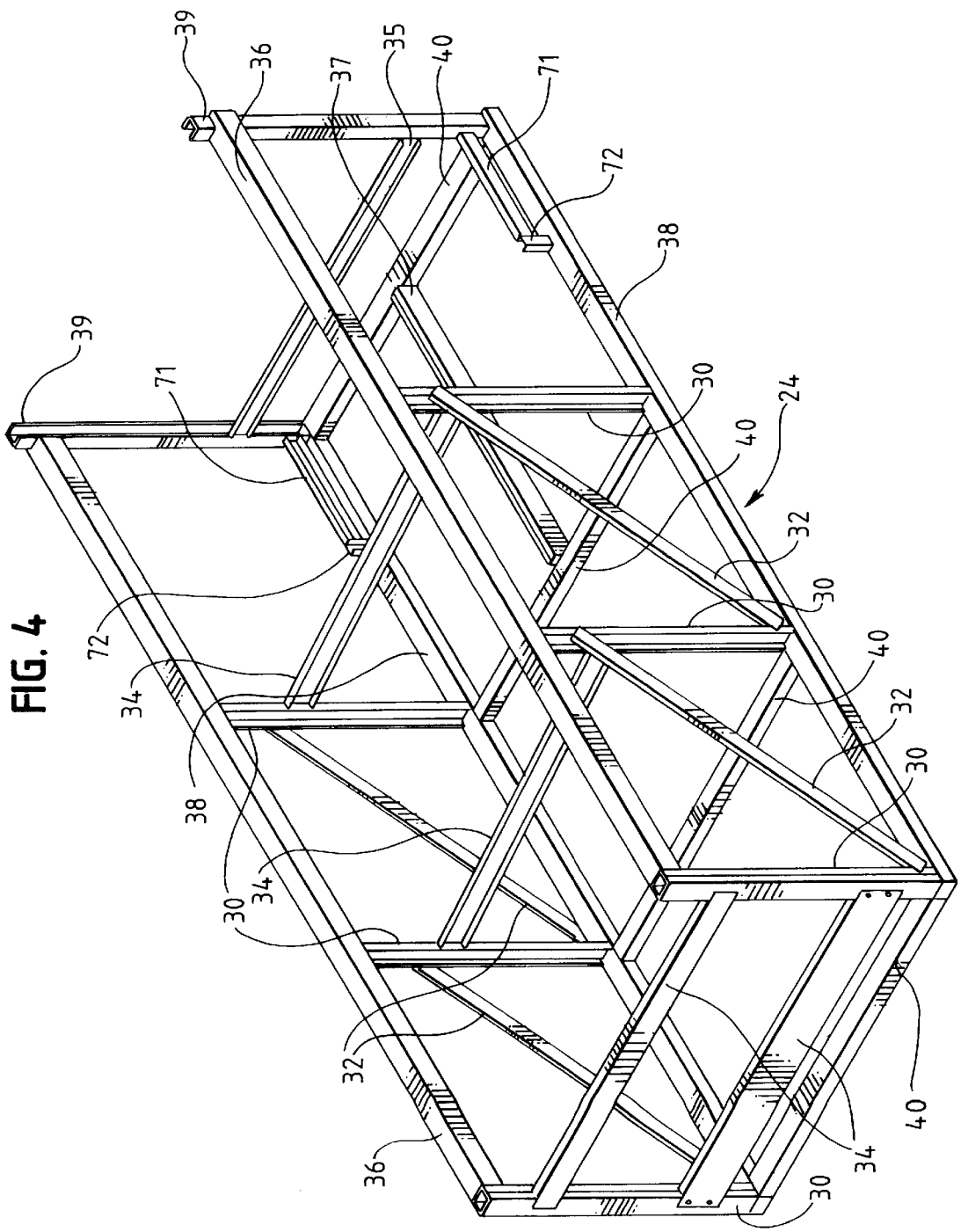

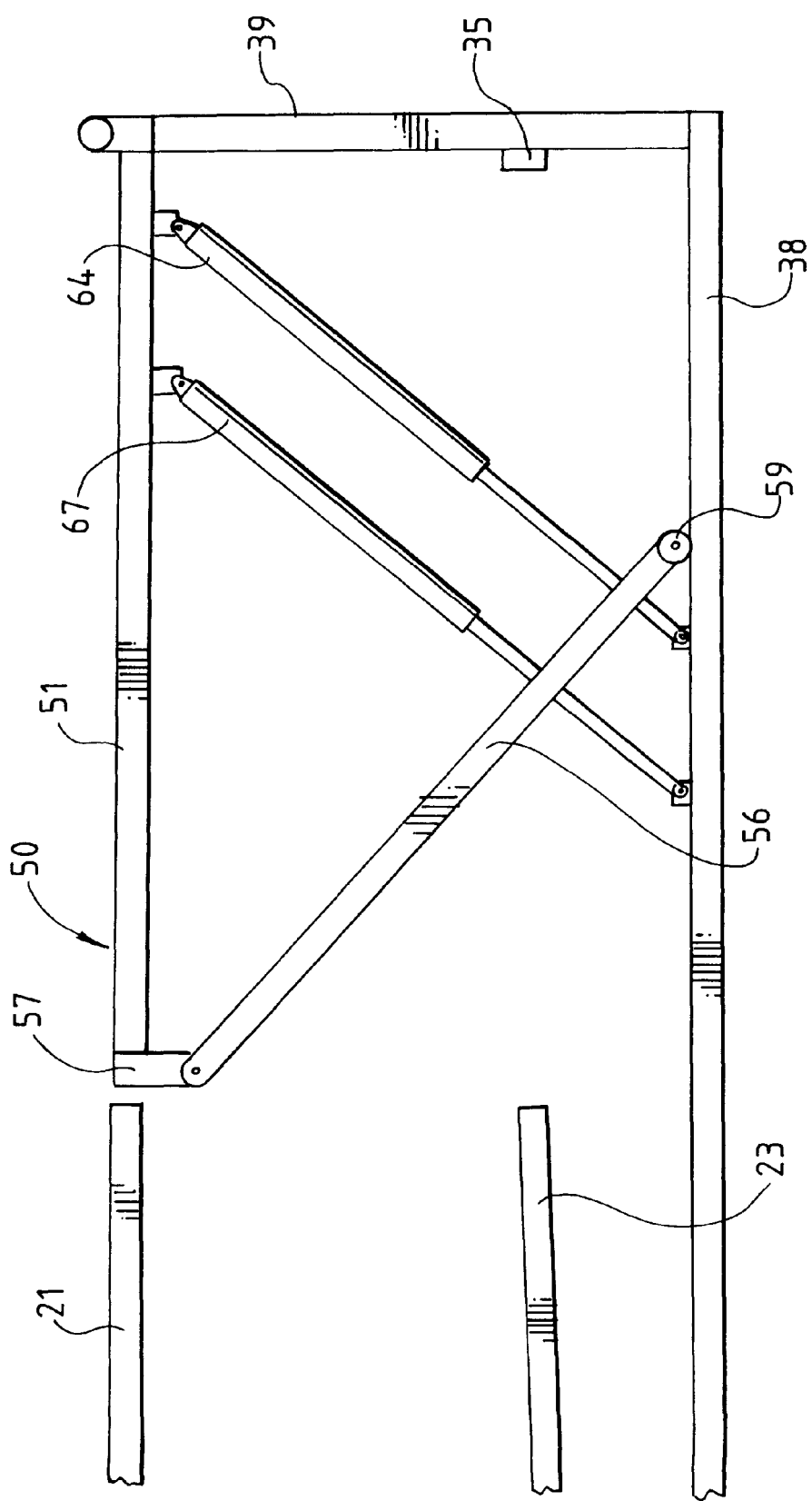

CONTAINER PICK AND RETURN SYSTEM

BACKGROUND OF THE INVENTION

The present inventions relate generally to container return systems and, more particularly, to container pick and return systems that permit the efficient delivery of containers and their contents to an access aisle for easy unloading and the automatic return of empty containers to a loading aisle. The present inventions are particularly advantageous when used in assembly line applications, such as the automotive industry. However, they are equally pertinent to a wide variety of other applications.

In assembly line applications, for example, an important consideration is the constant supply of parts, typically of a wide variety of sizes, shapes and weights, to the assembly line worker. Ease of access to these parts, the removal of empty parts containers, and the re-supply of parts are also important considerations to the overall efficiency of the process. Any delay in the flow of parts, any difficulty in access to parts or any difficulty in removing empty containers can lead to inefficiencies in the entire assembly line process.

Systems capable of accommodating these considerations are shown and described in U.S. Pat. No. 5,567,103 to Konstant and U.S. Pat. No. 5,642,976 to Konstant, both entitled "Unloading Device" (the "Konstant patents") (both of which are incorporated herein by reference). The Konstant patents teach, among other things, container unloading systems that selectively and automatically cycle carts carrying unit loads, such as containers or parts bins, to the front (or access aisle) of the system where the load is held at an angle for unloading. The system then cycles (returns) the carts and unloaded unit containers to the rear of the system (loading aisle) for re-loading and re-use. In other such systems, pallets or bins ride on pairs of parallel flow rails and carry the unit loads to the access aisle for use. The empty unit loads may then be selectively and automatically returned to the rear of the system for reloading.

Other available systems require the use of air cylinders, solenoids and motors to cycle unit loads. One such system is the Roll 'n Lift system by Creative Storage Systems, Inc. of Kennesaw, Ga. These devices utilize relatively complex electronics and pneumatics to present a pallet and return unloaded pallets and the like. Such systems suffer from, among other things, their expense, complexity and high maintenance.

In some applications, it is desirable to eliminate the necessity of wheeled carts used to carry the unit loads. In this manner, there is greater flexibility of unit load size and systems costs, and associated maintenance and shipping costs, may be reduced. For similar reasons, it is also desirable to eliminate the need for and complexity of electronically controlled air cylinders, pneumatics and motors. It is also desirable to have an efficient and smooth system that can be effective with heavy loads and provide the gentle presentation of such loads.

SUMMARY OF THE INVENTION

The present inventions preserve the advantages of container unloading and return systems and also provide new features and advantages. For example, the present inventions provide container unloading systems that can deliver unit loads, parts container bins and the like to an access aisle and automatically and smoothly present the loads at a desired angle for ease of access. The empty containers may then be automatically and selectively returned for refilling and another loaded container may automatically take its place. Such systems can accommodate a wide variety of load sizes, shapes and weights, including relatively heavy loads, all without the use of carts or complex electronically controlled pneumatics and the like.

In a preferred embodiment of the present inventions, a container pick and return system is provided having a two-tiered flow rail conveyor system that includes an inclined upper set of feed flow rails forming an input conveyor assembly and a lower set of inclined return flow rails forming an exit conveyor assembly upon which a unit load may roll. At the front end of the system is a transfer conveyor assembly that, upon receipt of a loaded container, automatically and smoothly positions the container at an angle increased from the input conveyor assembly to enhance the accessibility of the contents of the container. When the container is emptied by the line worker, the transfer conveyor assembly is triggered and the empty container is automatically lowered and transferred to the exit conveyor where it rolls down the exit conveyor to the rear of the system for reloading. Upon transfer of the empty container, the transfer conveyor assembly automatically returns to an upper position for receipt of another loaded container and subsequent angular presentation of the contents of the container. A trigger mechanism is provided to enable the selective transfer and return of unloaded containers through the activation of the transfer function. In addition, a container stop may be provided on the input conveyor such that a number of containers may wait in line behind one another in multiple depths on the input conveyor to be selectively advanced to the transfer conveyor assembly for use.

Accordingly, an object of the present invention is to provide a unit load unloading conveyor system that automatically returns empty containers, unit loads, pallets and the like to the rear of the system for reloading.

Another object of the present invention is to provide a transfer and return system that minimizes interference with the efficiency of the assembly line process by providing a steady stream of parts to the assembly line worker.

A further object of the present invention is to provide a smooth container return system that is effective for heavy loads and does not require the use of wheeled carts.

An additional object of the present invention is to provide a container unloading system that smoothly presents the contents of a container at an angle for ease of use and unloading and then smoothly, selectively and automatically transfers the unloaded container to the rear of the system.

Still another object of the present invention is to use gas springs and dampers in a container unloading system that smoothly and gently effectuates container presentation and transfer, which is also applicable for use with a wide variety of load weights, including heavy loads.

Still a further object of the present invention is to provide a container unloading system that automatically, selectively and smoothly transfers unloaded containers from an unloading end to a loading end where they may be stored or re-used.

Yet an additional object of the present invention is to eliminate the need for solenoids, motors and the like for a container unloading and return system, although such items may be used on or in conjunction with systems of the present invention.

Yet another object of the present invention is to provide a container unloading system that can accommodate multiple depths of containers and a wide variety of container contents.

Yet a further object of the present invention is to provide an unloading system that can be used in combination with other such systems and that can be used in conjunction with other transfer of storage and/or delivery systems.

INVENTOR'S DEFINITION OF THE TERMS

The terms used in the claims of this patent as filed are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

These and other features, objects and advantages will become apparent from the following descriptions and drawings wherein like reference numerals represent like elements in the various views, and in which:

FIG. 3 is a perspective view of a preferred embodiment of the present invention with the transfer conveyor assembly in a lowered or container return position;

FIG. 4 is a perspective view of a representative support structure of a preferred embodiment of the present invention;

DETAILED DESCRIPTION OF PREFERRED EMBODIMENTS

Set forth below is a description of what is currently believed to be the preferred embodiment or best representative example of the invention claimed. Future and present alternatives and modifications to this preferred embodiment are contemplated. Any alternatives or modifications which make insubstantial changes in function, in purpose, in structure or in result are intended to be covered by the claims of this patent.

A container unloading or unit load pick and return system in accordance with a preferred embodiment of the present inventions is shown generally in the Figures. By reference to FIGS. 1–3 and 1A–3A, the overall unloading system includes a two-level flow rail conveyor assembly 20; a transfer conveyor assembly 22; and, a support structure 24. Each of these system components, as well as the operation of the overall system, will be described below with particular reference to assembly line applications using containers or parts bins, examples of which are shown generally as 19 in FIGS. 1A–3A. It will also understood, however, that the present inventions may be used in a large number of other applications. In addition, the present inventions are applicable to pallets, slip sheets and unit loads.

Figure 5:
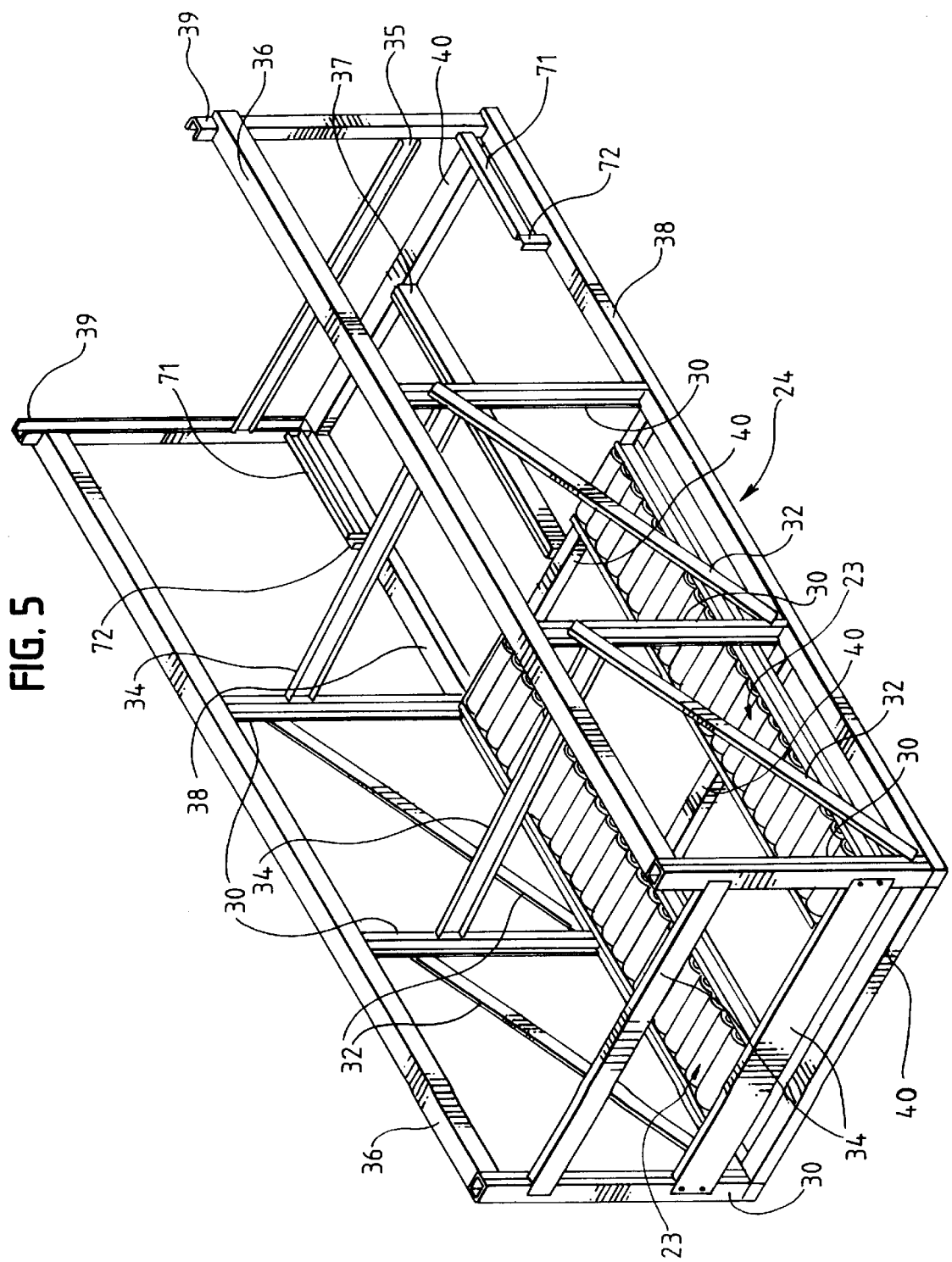
FIG. 5 is a perspective view of a representative support structure of a preferred embodiment of the present invention showing the placement of the return flow rails of the exit conveyor assembly.
Figure 6:
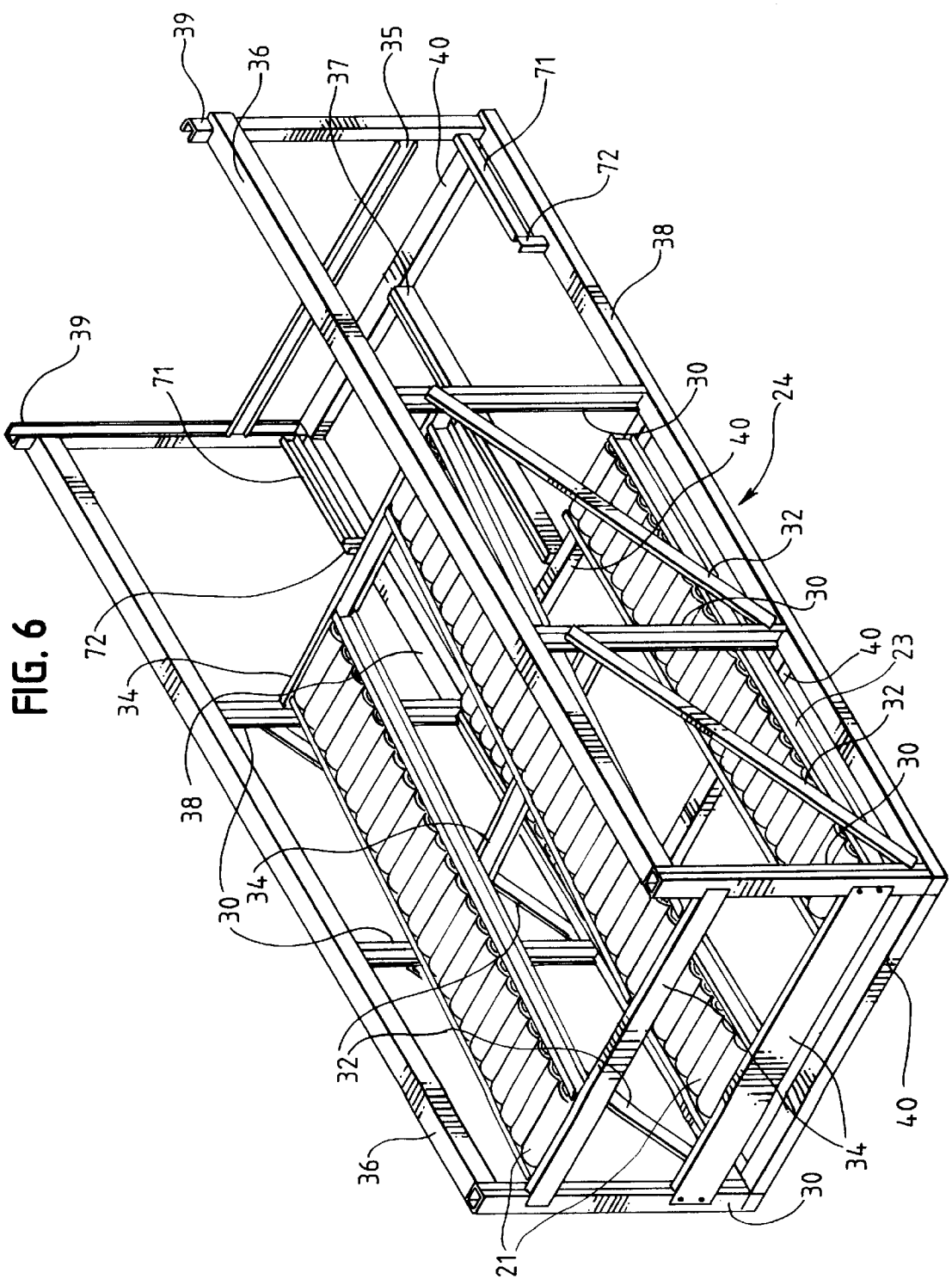
FIG. 6 is the view of FIG. 5, additionally showing the placement of the feed flow rails of the input conveyor assembly.

The support structure 24 is designed to support the flow rail conveyor system assembly 20 and the transfer conveyor assembly 22. The configuration of a preferred embodiment of the support structure 24 may be seen by particular reference to FIGS. 4–6. Support structure 24 includes a number of parallel columns 30, support braces 32 and a number of beams 34 interconnecting the parallel columns 30. The resulting configuration is generally similar to storage bays.

Also provided are top frame members 36, bottom frame members 38 and lower cross-frame members 40. A center bracket 37 (see e.g., FIGS. 1–3) may be provided which may be used to, among other things, accommodate the pivotal attachment of various components of the transfer conveyor assembly 22, as hereinafter described. In addition, in a preferred embodiment of the present invention, support structure 24 includes front guide columns 39. Guide columns 39 are formed by opposing, inwardly facing channel members. In addition to serving a support structure 24 function, front guide columns 39 serve as guides for various components of the transfer conveyor assembly 22, also as hereinafter described. A stop 35 may also be provided on the support structure to determine or limit the angle of presentation of containers, depending upon the application and type of access desired.

It will be understood that any number of support structures 24 may be placed in side-by-side relationship, or even stacked one on top of the other, also depending upon the application. Depending upon the design load, any necessary support can be provided by additional or larger columns, beams and the like, which may be attached in any variety of ways such as bolts, welding and the like. In addition, generally tubular structural members are used for the majority of the components of a preferred embodiment of the support structure 24, as well as many of the components of the transfer conveyor assembly 22, as shown in the Figures. Such members provide the preferred strength and torsional and stiffness characteristics of the preferred embodiment. However, a wide variety of cross-sectional shapes, such as cold-rolled I and S beam cross-sections, may also be used for the support structure and other components of the present inventions.

With reference to FIGS. 1–3, 1A–3A and FIGS. 4–6, conveyor rail system 20 is supported by support assembly 24. In a preferred embodiment of the present invention, conveyor rail system 20 consists of a pair of spaced, parallel input flow conveyors 21 and a pair of spaced, parallel exit return flow conveyors 23. As will be understood by those of skill in the art, the input 21 and return 23 flow conveyors may be formed from a series of in-line rollers that define rolling surfaces which permit a container, pallet or unit load to roll along their length. In the preferred embodiment, a pair of input 21 and exit 23 conveyors are utilized. However, depending upon the type of container or unit load for which the system is designed, as well as the design loads, one or any number of additional flow conveyor assemblies may be used. Alternatively, a single flow conveyor assembly may be used for the input 21, exit 23 and/or transfer conveyor 25.

Input conveyors 21 are sloped gradually downward from the rear to the front of the system and return conveyors 23 are sloped downward from the front to the rear of the system. The forward end of input conveyor 21 and return conveyor 23 terminates before the front end of the system in order to accommodate the transfer conveyor assembly 22. In addition, and of particular utility in multiple container applications, a container release mechanism may be placed on or cooperate with the input conveyor 21 to enable the selective release of containers to the transfer conveyor assembly 22. One example of a suitable container or other unit load release assembly is shown and described in U.S. Pat. No. 5,873,473, entitled "Release Mechanism for Carts, Pallets or Unit Load Storage System," which issued to John F. Pater and was assigned to Konstant Products, Inc., and which is incorporated herein by reference. Such a release may be readily utilized with the present inventions. In addition, retarders or brakes (not shown) may be incorporated along the input conveyor 21 in order to slow the flow of and separate any containers in the system, especially when multiple depths of containers are utilized. The type and incorporation of retarders or brakes in the present invention will be understood by those of ordinary skill in the art. In general, however, such retarders may take the form of a large rubber roller having a centrifugal brake assembly, the surface of which contacts the bottom of a roller which is in contact with the unit load or container. In this manner, among others, the flow of containers may be slowed and desired spacing maintained between containers.

Figure 1:
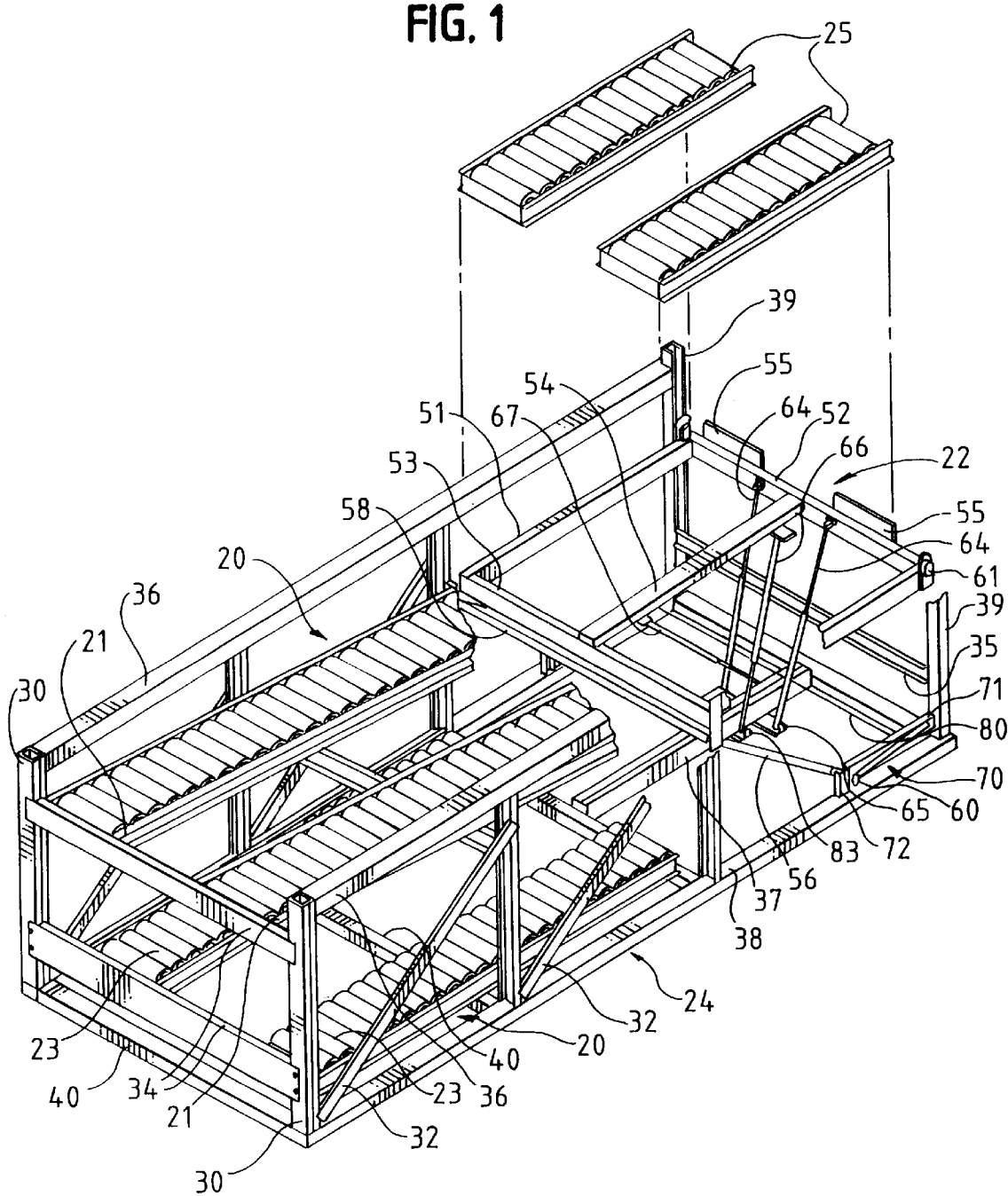
FIG. 1 is a semi-exploded perspective view of a preferred embodiment of the present invention shown with the transfer conveyor assembly in an upper or container entry position.
Figure 1A:
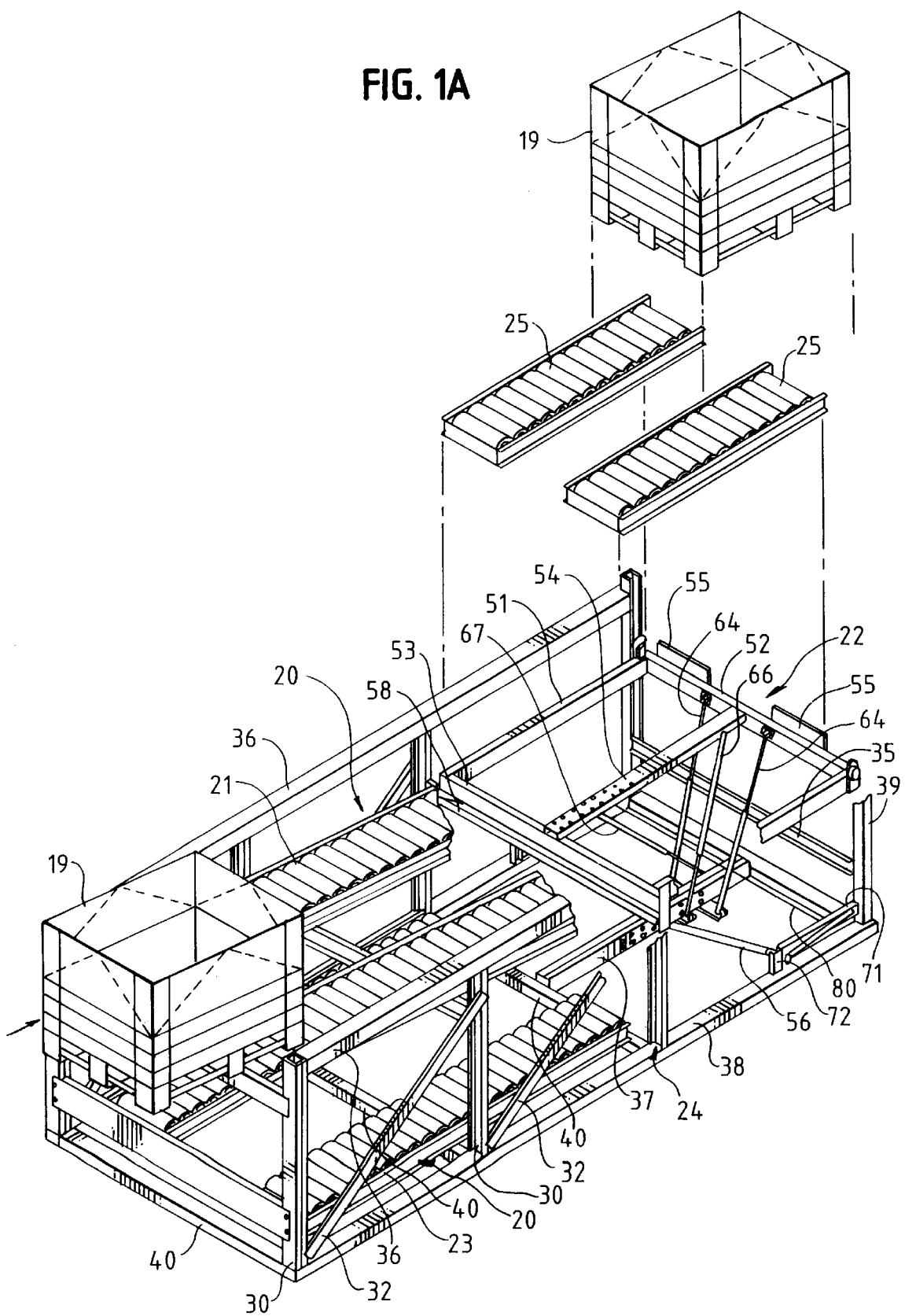
FIG. 1A is a semi-exploded perspective view of the preferred embodiment of the present invention of FIG. 1 with representative containers shown in the entry position.
Figure 2:
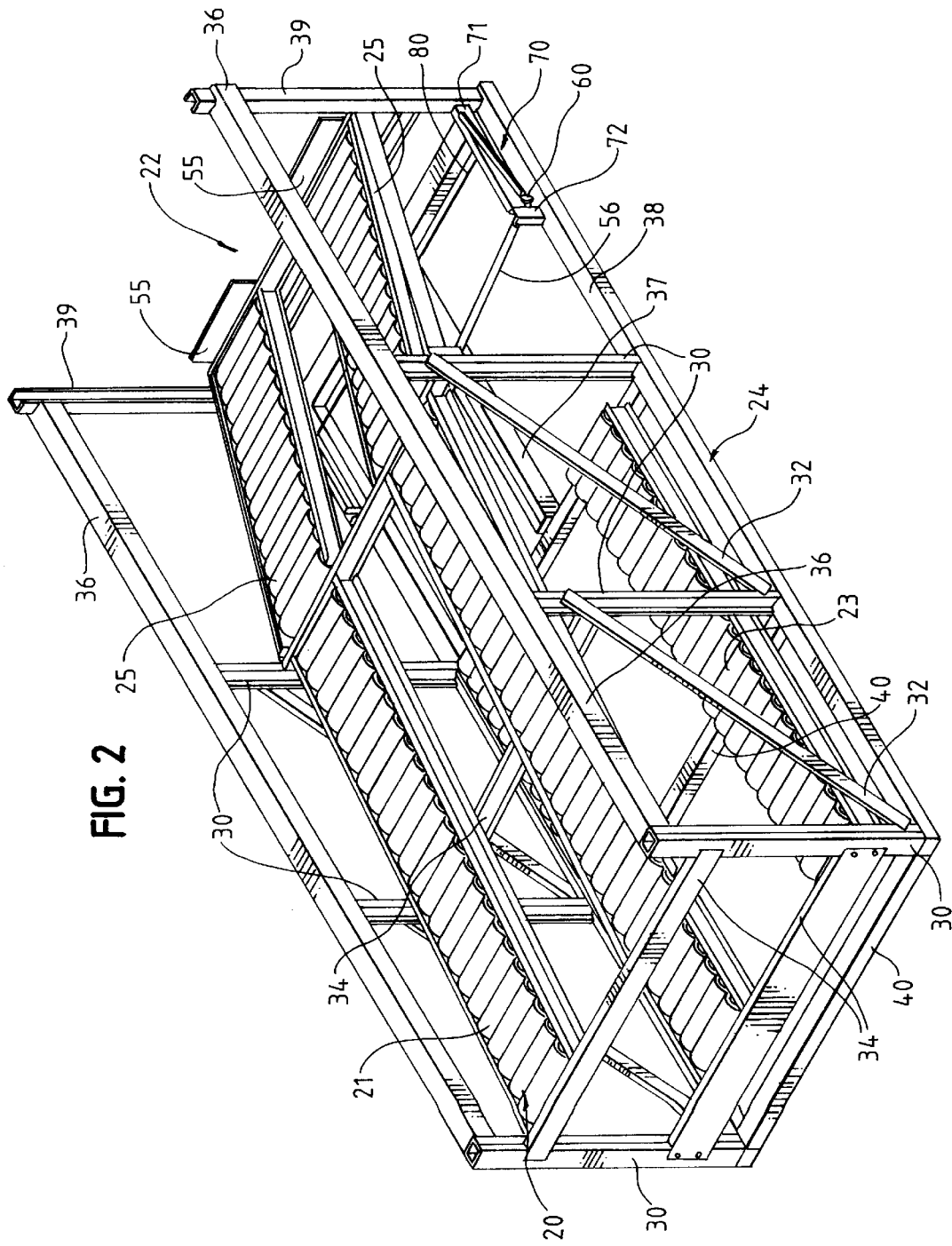
FIG. 2 is a perspective view of a preferred embodiment of the present invention with the transfer conveyor assembly in a container pick or unloading position.
Figure 2A:
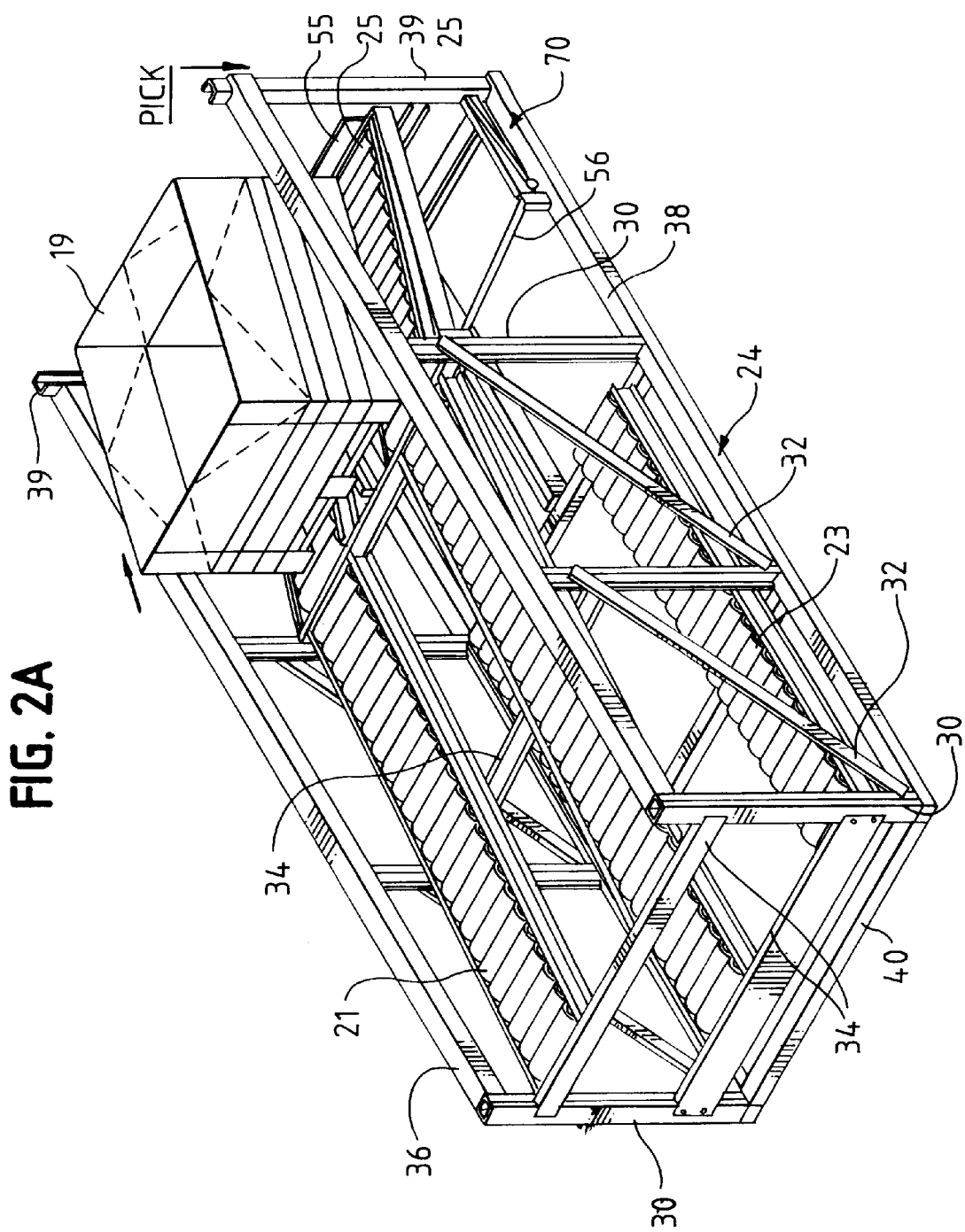
FIG. 2A is a perspective view of the preferred embodiment of the present invention of FIG. 2 with a representative container shown in a pick or unloading position.
Figure 3A:
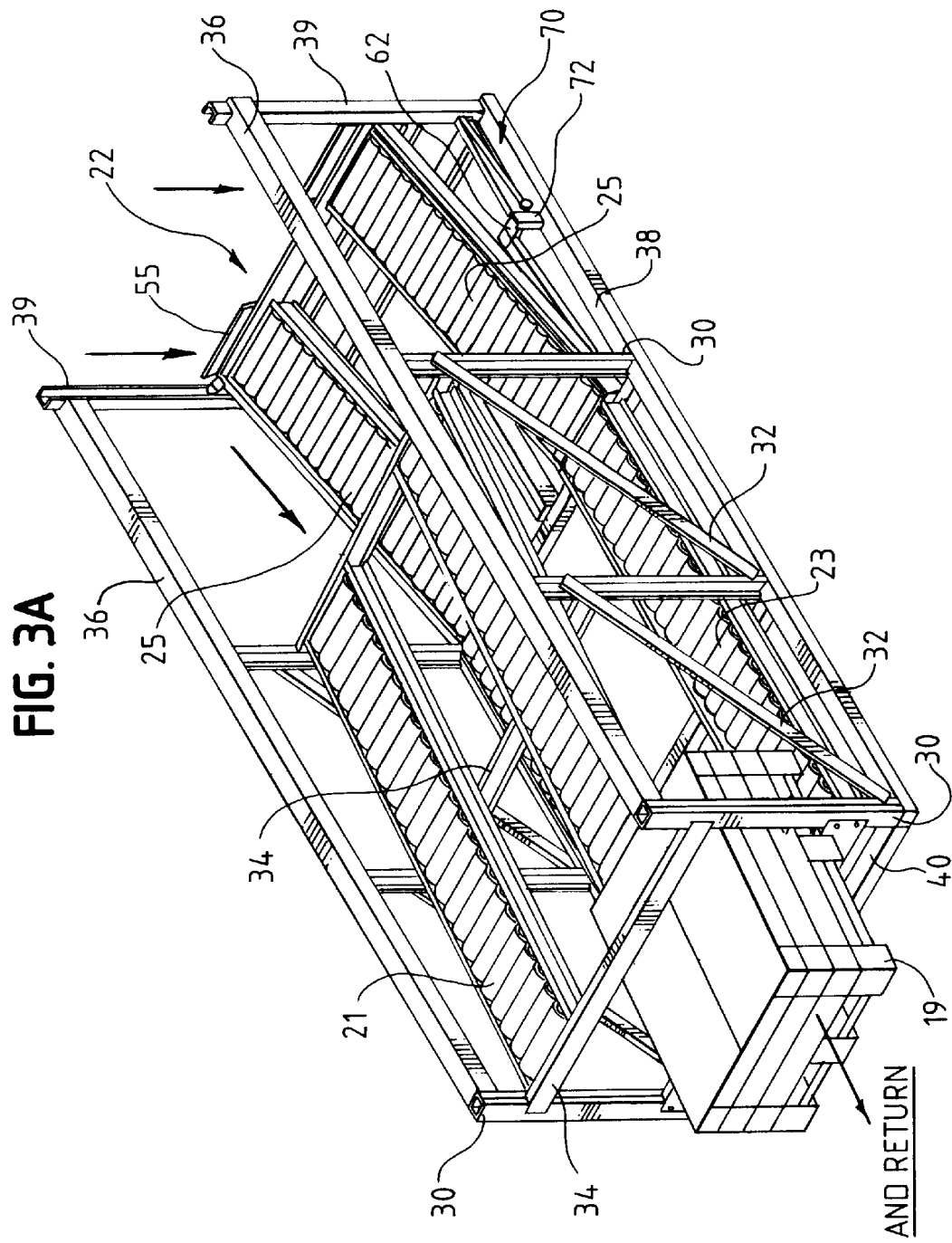
FIG. 3A is a perspective view of the preferred embodiment of the present invention of FIG. 3 with a representative container shown in a lowered or container return position.

The preferred transfer conveyor assembly 22 of the present inventions may be better understood by reference to FIGS. 1–3, 1A–3A and 7–12. The assembly 22 consists of a container deck 50 which may be constructed from a number and variety of structural members, including side deck members 51, front deck member 52, rear deck member 53 and center deck support 54. As will be hereinafter described, container deck 50 and center deck support 54 may be used to accommodate some of the other components of the transfer conveyor assembly 22. Container stops 55 are provided at the front of container deck 50. Attached to container deck 50 are transfer flow conveyors 25 (FIGS. 1–3). Transfer flow conveyors 25 are in line with the input flow conveyors 21 to receive a container or other load (see FIGS. 1A–3A). The transfer flow conveyors 25 then move with container deck 50 during the parts presentation and transfer modes as hereinafter described.

The rear end of container deck 50 is adapted to receive deck support arms 56, which extend downwardly to bottom frame members 38. Specifically, in a preferred embodiment, deck support arms 56 are pivotably connected at their proximate end to rear deck member 53 using tabs 57 or similar methods and configurations. A stabilizer bar 58 (FIGS. 1, 1A and 11) may also be provided to ensure that deck support arms 56 rotate the same amount when the system is under load and in operation. The distal ends of deck support arms 56 are adapted to rollingly engage bottom frame members 38. In a preferred embodiment, the distal ends of deck support arms 56 are provided with extenders 62 (see FIG. 12), the ends of which are adapted to accommodate wheels or rollers 59 (see FIG. 13). In the preferred embodiment, wheels 59 are flanged and include a second wheel or roller stop wheel 60 to cooperate with trigger mechanism assembly 70, as hereinafter described (see FIG. 13). Alternatively, the distal end of the deck support arms 56 may be adapted to slide or otherwise move along bottom frame members 38 or the ground and the like.

The front end of container deck 50 is adapted to accommodate guide wheels 61. Guide wheels 61 may be affixed to container deck 50 by any number of ways that are well known to those of ordinary skill in the art. Guide wheels 61 are sized and positioned to ride within the channels of front guide columns 39. In this manner, and in conjunction with deck support arms 56, container deck 50 is kept in proper alignment throughout its range of operation during container transfer and parts presentation.

Deck support arms 56, and hence the rear of container deck 50, are held in the entry position (see e.g., FIG. 1) by trigger mechanism 70, which also serves to permit the selective activation of the transfer assembly 22. Trigger mechanism 70 consists of horizontal bracket member 71 and vertical bracket member 72, both of which serve as the frame structure for trigger lever 73. Horizontal bracket member 71 is connected at its front end to guide columns 39 and at its rear end to vertical bracket member 72, which in turn is connected to bottom frame member 38. Trigger lever 73 is pivotably mounted to horizontal bracket member 71 by a torsional bar or shaft 80. Alternatively, pins 74 or other well known means may be used (see FIG. 14).

In situations where multiple container pick and return systems are used side-by-side in rows, it may be helpful to position the means for activation of the trigger mechanism 70 on the front of the system, rather than the sides as shown in the preferred embodiment. One way to accomplish this is to provide the torsion bar 80 with a welded angle, plate or tab (not shown) that extends out of (or is accessible from) the front of the system. When transfer is desired, the operator may simply step on the angle or other member causing the torsion bar 80 to rotate and thereby rotate and activate the trigger lever 73. Other means will be readily understood by those of skill in the art as dictated by the actual use and set-up of the system.

Figure 13:
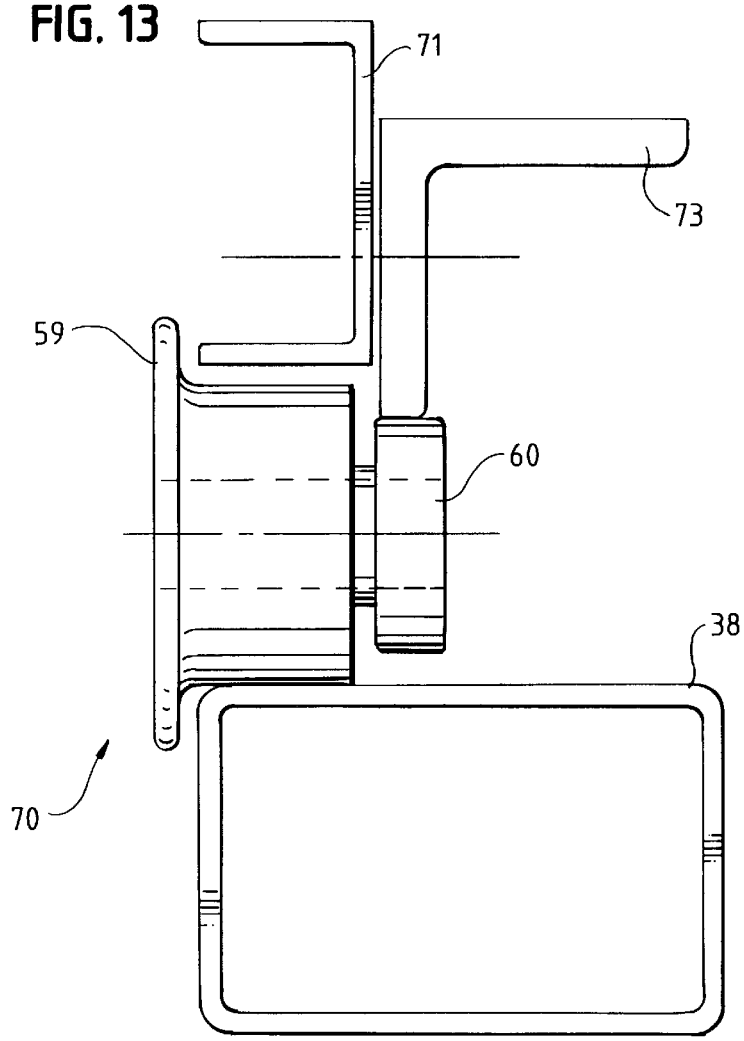
FIG. 13 is a greatly enlarged end view of flanged wheels on a common axis of a preferred embodiment of a component of a transfer conveyor assembly of the present invention.
Figure 14:
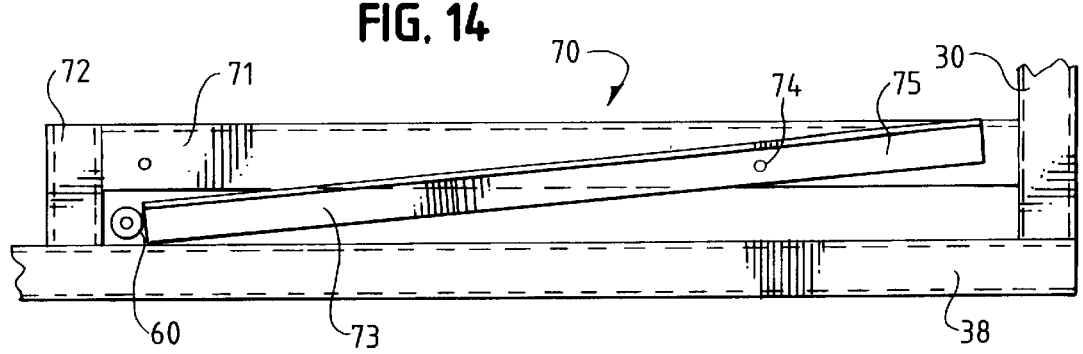
FIG. 14 is a side view of a preferred trigger or activation mechanism component of the transfer conveyor assembly of a preferred embodiment of the present invention.
Figure 15:
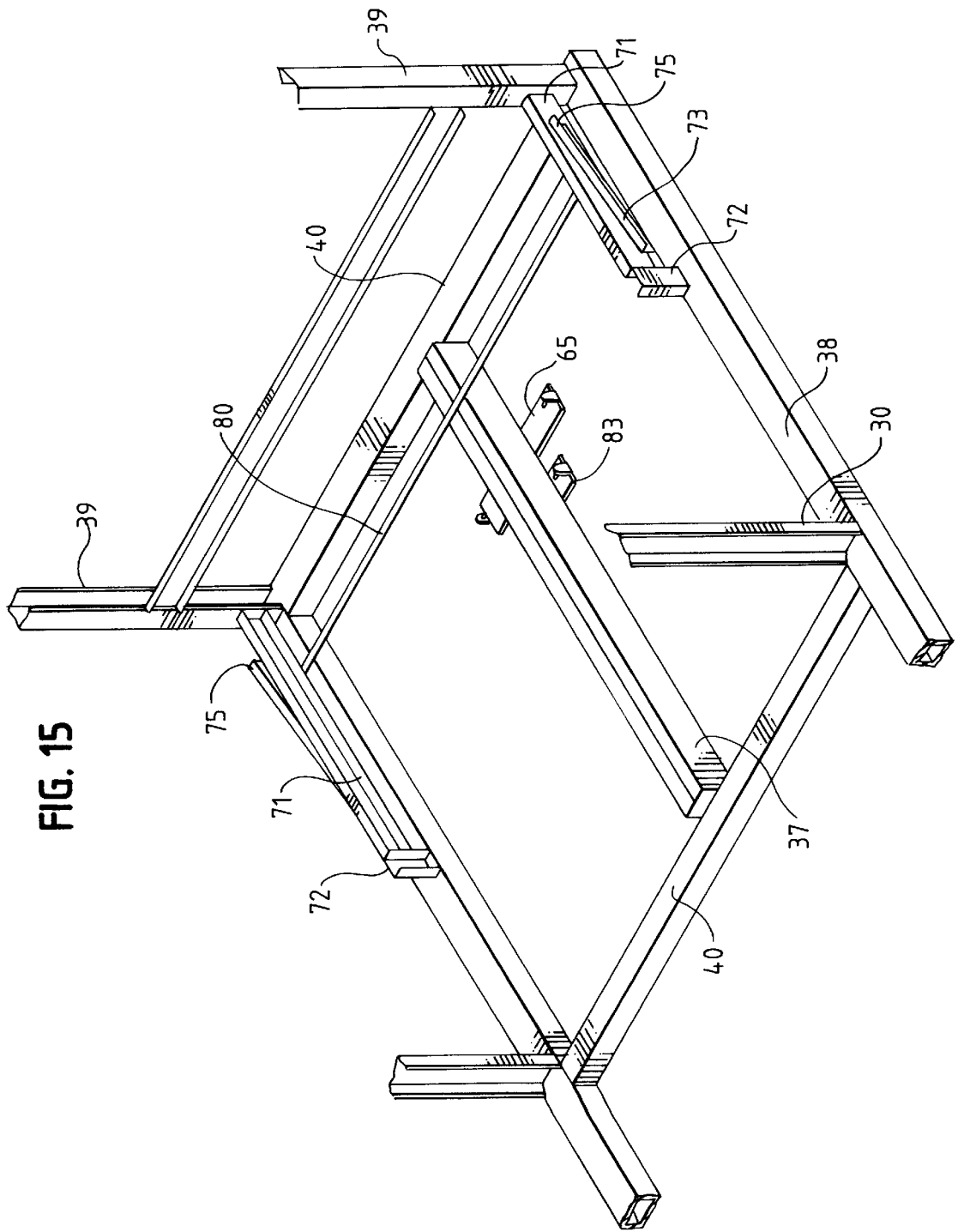
FIG. 15 is a perspective view of portions of a representative support structure and trigger mechanism component of a preferred embodiment of the present invention; and, FIG. 16 is a side schematic view of an alternative embodiment of the transfer conveyor assembly of the present invention shown in the upper or container entry or feed position.

Deck support arms 56, and their wheels 59, are placed forward of vertical bracket member 72 so that they may roll forward along bottom members 38. The rear end of trigger lever 73 engages stop wheel 60 when the transfer assembly 22 is in the pick position and the trigger mechanism 70 is in the stop position, as shown in FIG. 14. When transfer of an empty container is desired, the forward end 75 of trigger lever 73 is activated, for example, by stepping on it. Upon activation, trigger lever 73 disengages stop wheel 60 (see FIG. 13), which enables flanged wheel 59 to roll forward along bottom member 38 and effectuates transfer, as hereinafter described. A torsion bar 80 may also be provided which interconnects the trigger lever 73 on each side of the system and in the preferred embodiment, acts as a shaft which pivots with trigger lever 73. In this manner, when two trigger mechanism assemblies 70 are utilized, torsion bar 80 enables the simultaneous and equal activation of the system (see e.g., FIG. 15).

In a preferred embodiment, at least one or more, but preferably two, gas dampers 64 are provided as part of the transfer conveyor assembly 22. The dampers 64 are connected at one end to front member 52 of container deck 50. The other end of gas dampers 64 is angled downwardly from front members 52 and attached to center bracket (37) through tabs 65 or other well known means. The dampers 64 control the descent of the loaded container deck for smooth presentation, as well as supporting a substantial portion of the load.

At least one, and preferably two, gas springs 66 and 67 are also provided as part of transfer conveyor assembly 22. Front gas spring 66 is connected to center support 54 of container deck 50 and is angled downward toward the rear of transfer conveyor assembly 22 and is pivotably mounted to center deck bracket 37. Rear gas spring 67 is also pivotably mounted to center support 54 of container deck 50 toward the rear of the assembly, and is angled downward toward the front and is pivotably mounted to center bracket 37. Alternatively, rear gas spring 67 may be mounted to tabs 83, which are mounted to center bracket 37 or to the floor (see FIGS. 1 and 15). Gas springs 66 and 67 aid in controlling the descent of container deck 50 during parts presentation and transfer, and also serve to return the deck to its upper or loading position after completion of transfer. Center support 54 of container deck 50 and center deck bracket 37 of support structure 24 may be provided with a series of holes (see e.g., FIGS. 10–12). In this manner, the placement of gas springs 66 and 67 and gas dampers 64 may be adapted to provide smooth and effective operation depending upon the design load of the system and may be readjusted for different loads.

Alternative arrangements of the gas springs 66, 67 and gas dampers 64 may be utilized. For example, only one of each may be utilized. And, as shown in FIG. 16, the gas spring 67 and gas damper 64 may be configured in a manner other than that of the preferred embodiment to achieve smooth and efficient transfer, as discussed herein. As another example, one gas spring 67 and one gas damper 64 may be positioned on each side of the transfer conveyor assembly 22. In this configuration, the gas dampers 64 and gas springs 67 are pivotably connected between side deck members 51 and bottom member 38, which may include an angle with a plurality of holes (not shown) for ease of assembly and adjustment.

The preferred gas springs 66 and 67 are presently available from Hahn Gas Springs of Aichschieb, Germany; namely, its gas spring model number G-14-28. Although other types and makes of gas springs may be used in the present invention, these gas springs provide the best operation and adjustability of the spring factor or constant. Other acceptable gas springs are available from Suspa, Inc. of Grand Rapids, Mich. and Stabilus of Colmar, Pa. Similarly, gas dampers 64 are presently available from Hahn Gas Springs; namely, its model number D14–40. Other suitable gas dampers that provide controlled action that can handle the designed load and control the descent of the load may be used.

Figure 7:
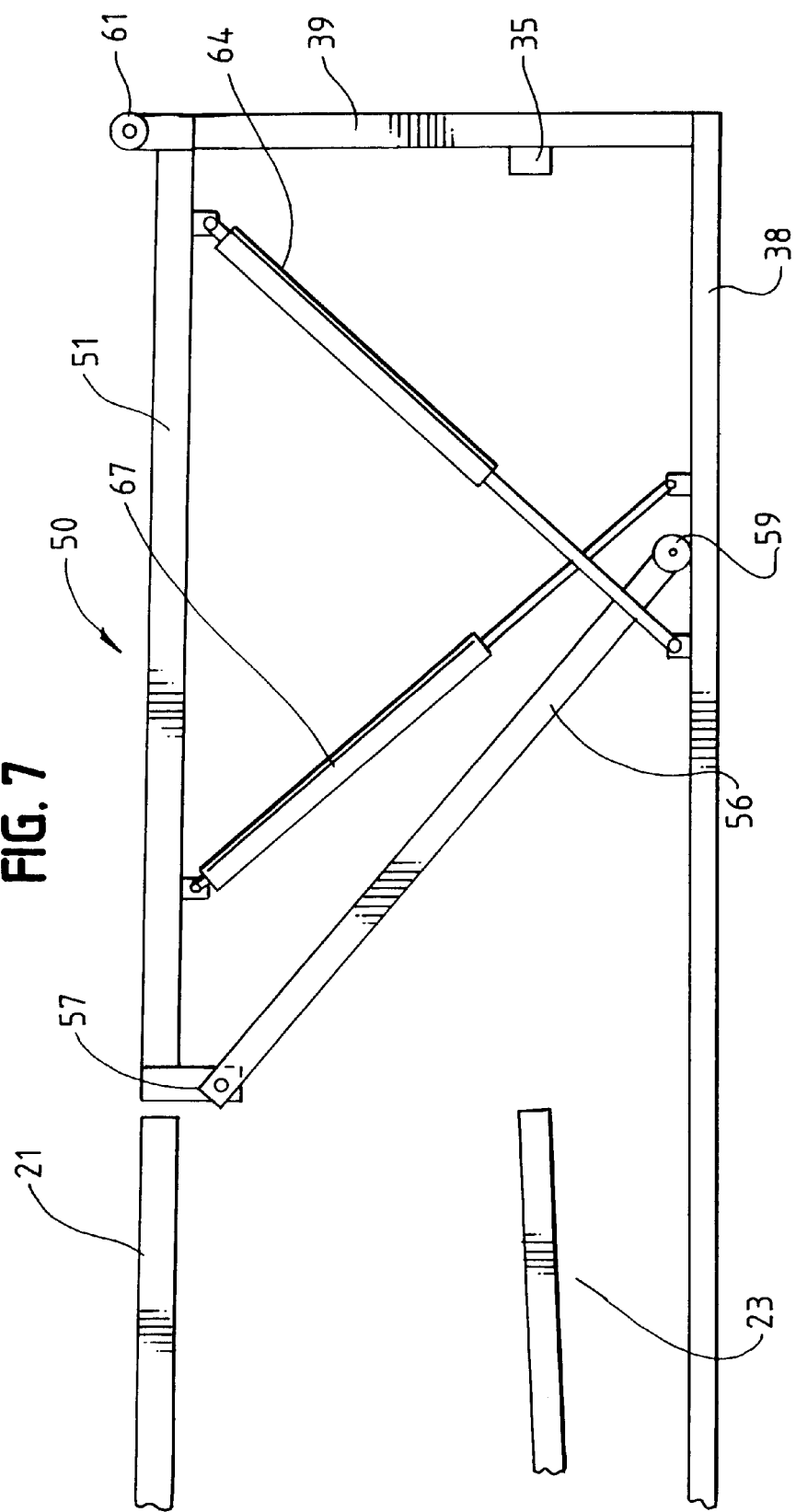
FIG. 7 is a side schematic view of a transfer conveyor assembly of a preferred embodiment of the present invention shown in the upper or container entry or feed position.
Figure 8:
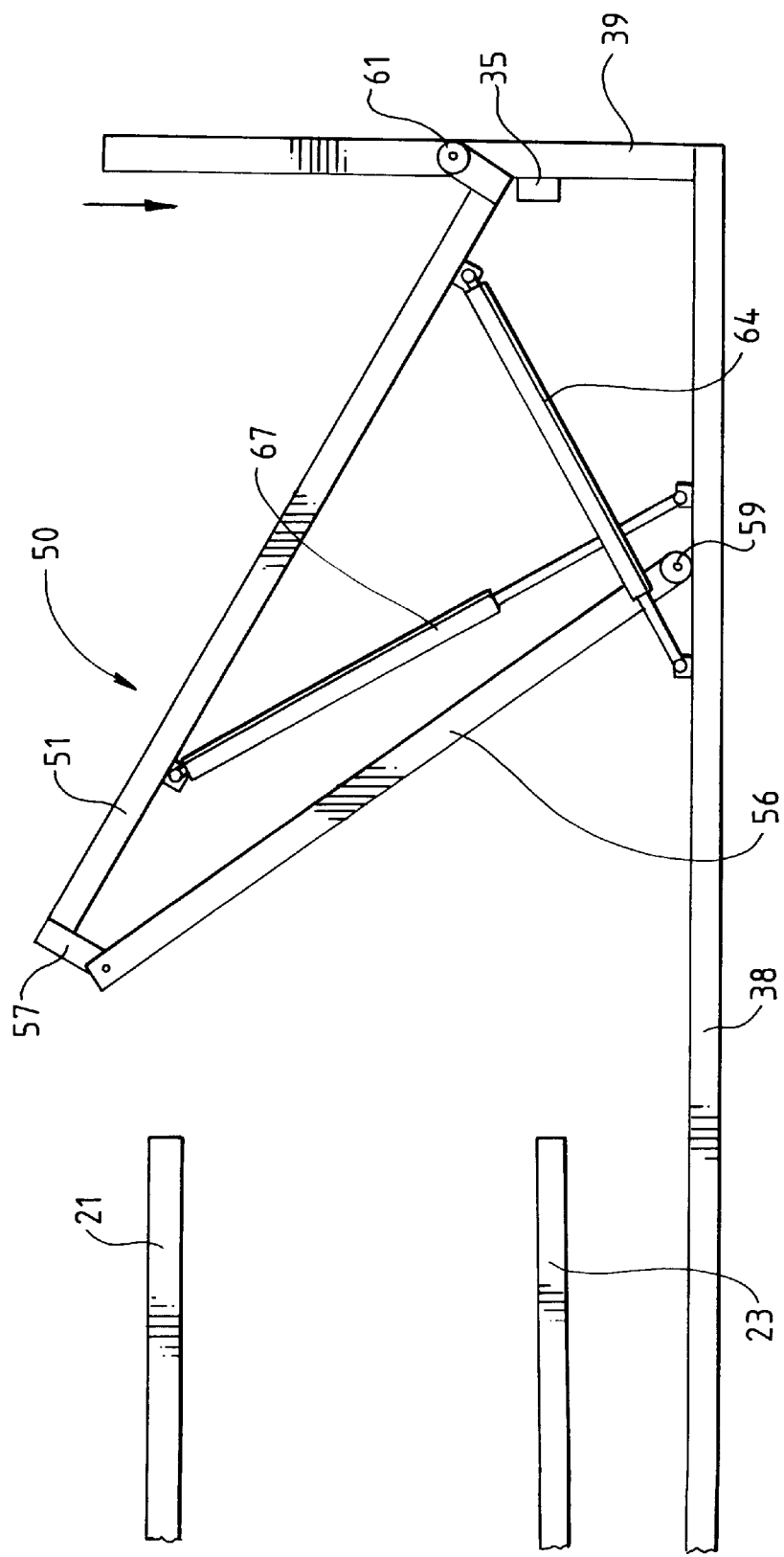
FIG. 8 is a side schematic view of a transfer conveyor assembly of a preferred embodiment of the present invention shown in the container pick or unloading position.
Figure 9:
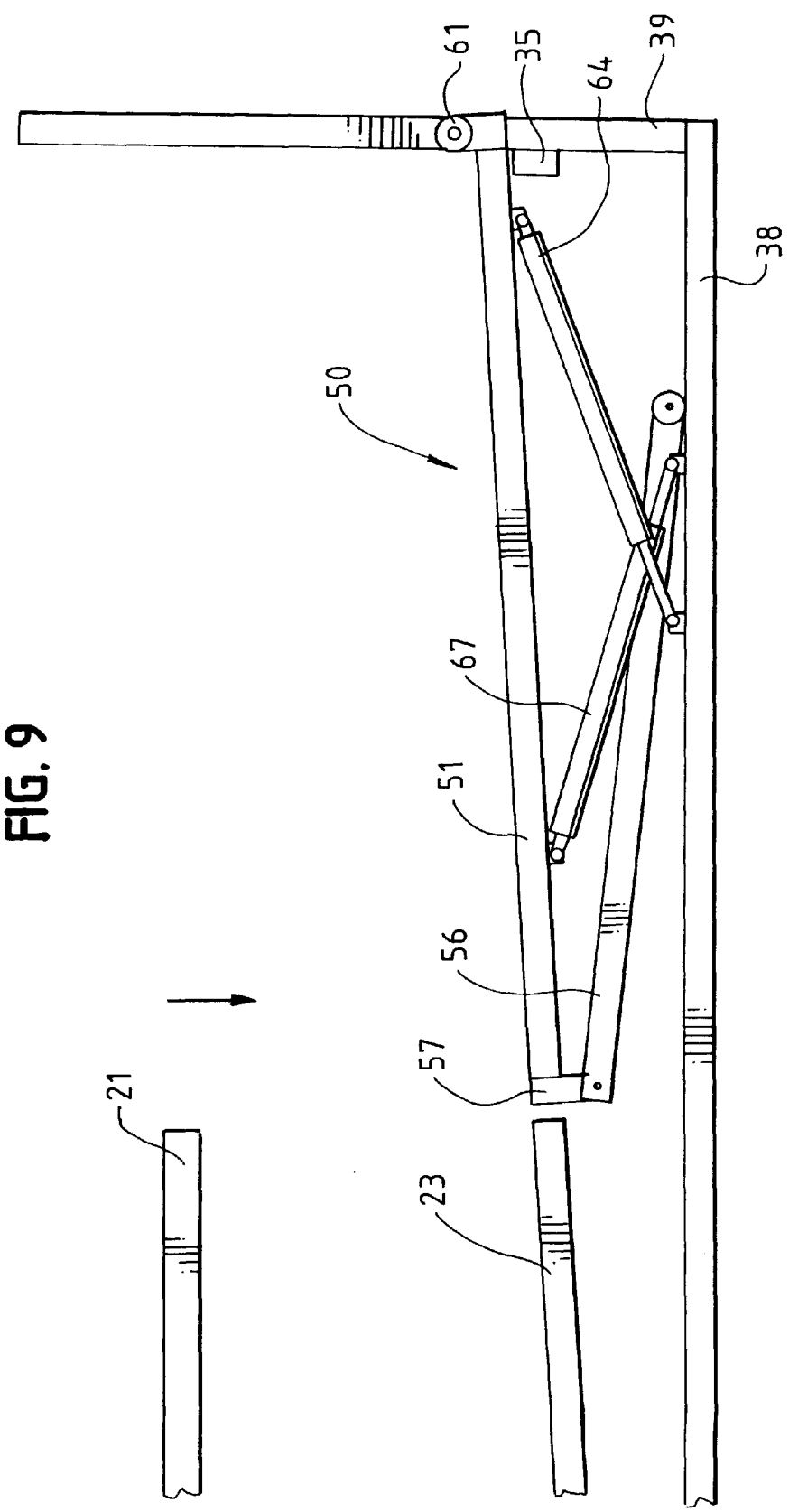
FIG. 9 is a side schematic view of a transfer conveyor assembly of a preferred embodiment of the present invention shown in the lowered or container return or exit position.
Figure 10:
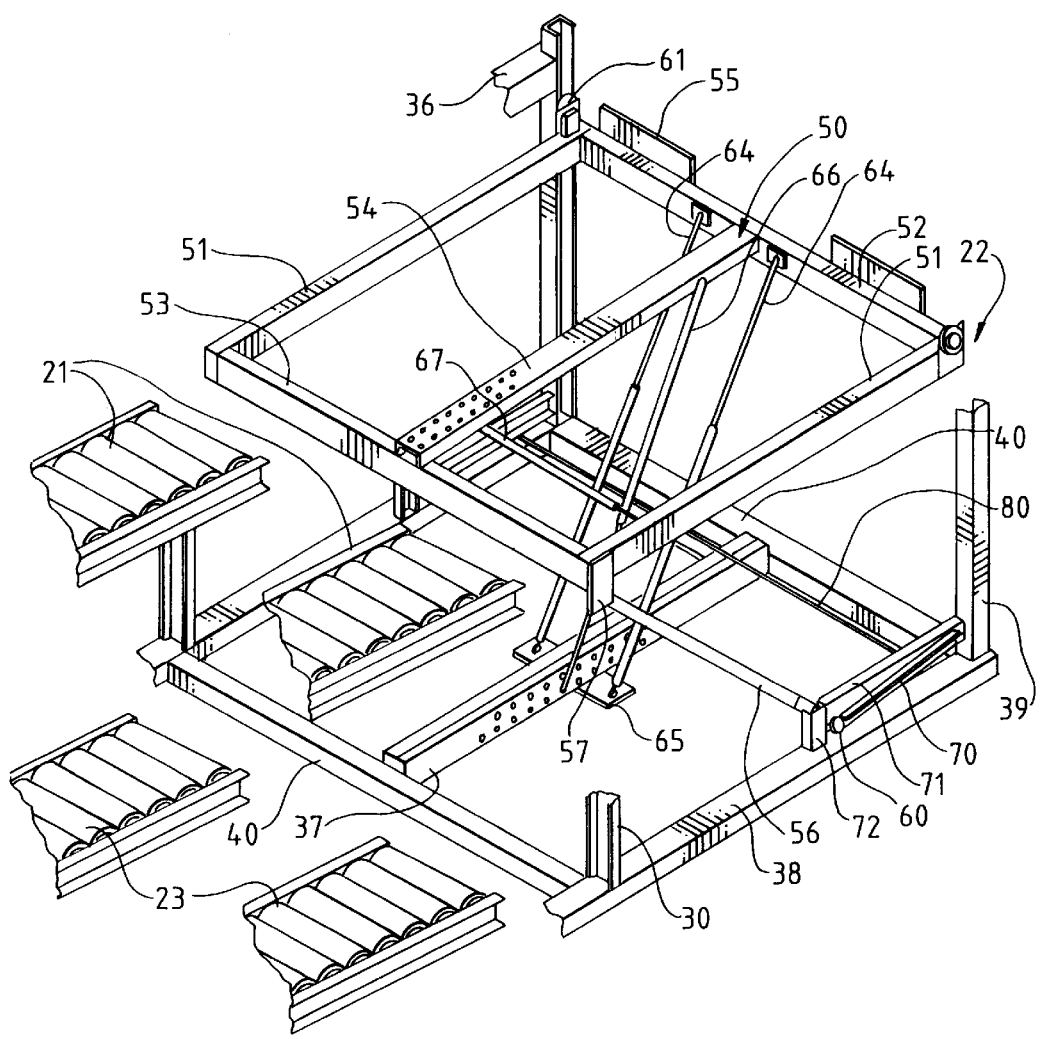
FIG. 10 is a perspective view of a transfer conveyor assembly of a preferred embodiment of the present invention with portions removed to reveal various components of the assembly shown in an entry or feed position.
Figure 11:
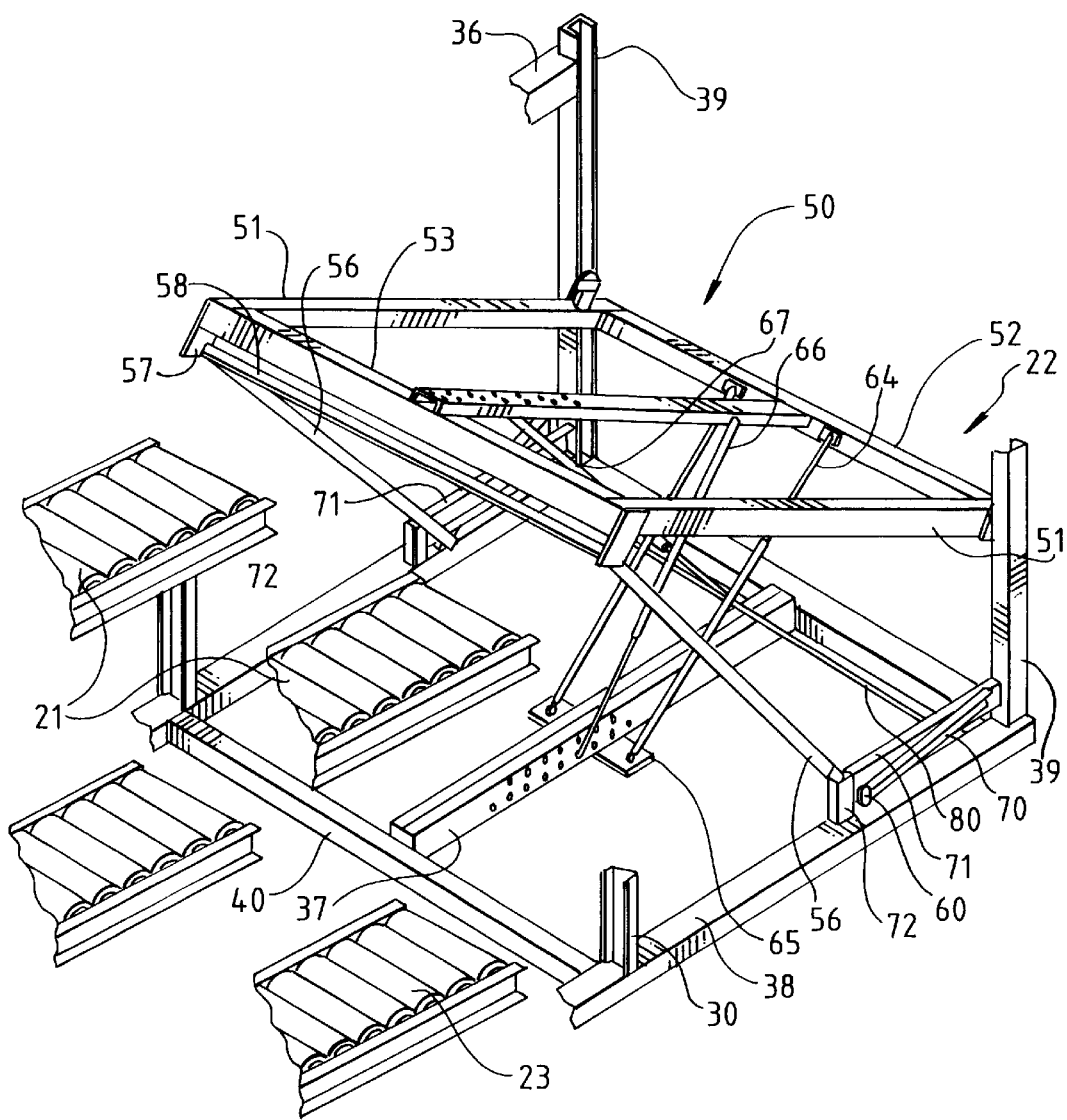
FIG. 11 is a perspective view of a transfer conveyor assembly of a preferred embodiment of the present invention with portions removed to reveal various components of the assembly shown in a pick or unloading position.

The operation of a preferred embodiment of the present invention may be better understood by reference to FIGS. 1–3 and 7–12. The entry position is shown in FIGS. 1, 7 and 10. A loaded container or parts bin 19 (FIGS. 1A–3A) is placed on the rear end of input conveyor assembly 21. As previously described, retarders may be used on the input conveyor 21. And, if a container release mechanism (not shown) is employed along input conveyor 21, container 19 will be engaged. Upon any such release, the container rolls forward onto transfer conveyor 25 until it comes into contact with container stop 55. The weight of the container forces the front end of container deck 50 downward to present the parts at a desirable unloading and use angle, as shown in FIGS. 2, 8 and 11. Dampers 64 and front gas spring 66 counteract some of the weight and slowly and smoothly lower the load to the desired angle as established by stop 35. Guide columns 39, in conjunction with guide wheels 61, keep the container deck assembly in proper alignment upon descent.

Figure 12:
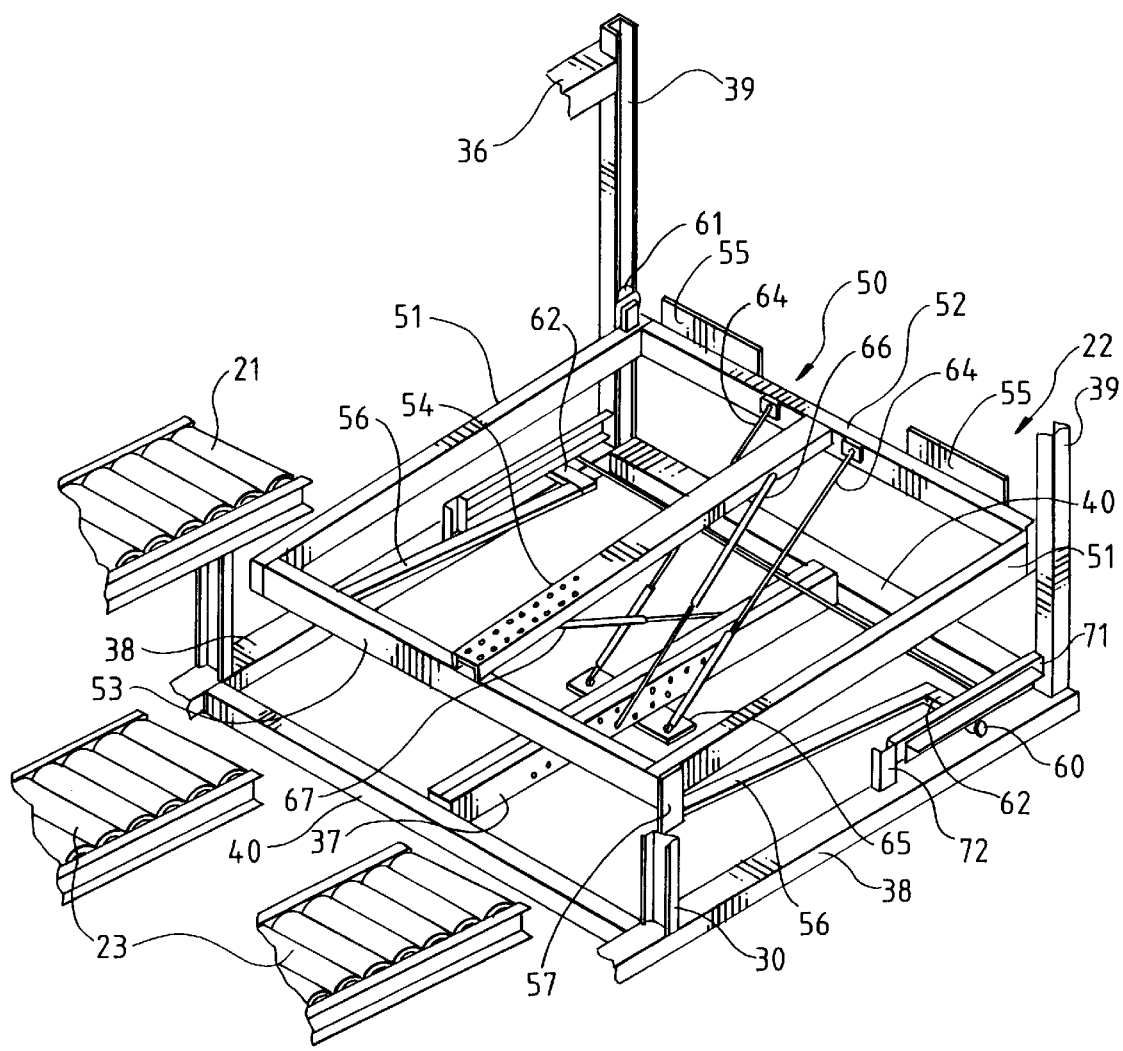
FIG. 12 is a perspective view of a transfer conveyor assembly of a preferred embodiment of the present invention with portions removed to reveal various components of the assembly shown in a return or exit position.

Once the container is unloaded and the container collapsed, if necessary, trigger mechanism 70 is activated by depressing the forward end 75 of trigger lever 73. As a result, stop wheel 60 is disengaged from trigger lever 73 and the wheels 59 of deck support 56 roll forward on bottom members 38. The rear of transfer conveyor assembly 22 and container deck 50 ease downward so that the empty container may roll down transfer conveyor 25 and onto exit conveyor 23, as shown in FIGS. 3, 9 and 12. Once the empty container clears the transfer conveyor 25 and rolls toward the rear of the system, gas springs 66 and 67 counteract the weight of the transfer conveyor assembly 22, and push the assembly up into the input position and ready to receive the next container. In this manner, smooth and efficient transfer of, for example, parts bins is accomplished.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention.

Various features of the present inventions are set forth in the following claims.

What is claimed is:

1. A unit load pick and return system, comprising:
   an inclined input conveyor assembly;
   an inclined exit conveyor assembly located below said input conveyor; and,
   a transfer conveyor assembly having a front and rear end, said front end moveable downwardly to enable the unit load to be presented at an angle greater than the inclination of the input conveyor for unloading while said rear end remains in alignment with said input conveyor, said rear end moveable downwardly to a position below said front end and in alignment with said exit conveyor to form a downwardly directed incline that selectively and automatically transfers an unloaded unit load carrier from the input conveyor assembly to the exit conveyor assembly, and said front and rear end jointly moveable upwardly to return the transfer conveyor assembly to a position in alignment with said input conveyor assembly to receive a unit load from the input conveyor assembly.

2. The invention of claim 1 wherein the transfer conveyor assembly includes a deck support arm.

3. The invention of claim 2 wherein a trigger mechanism is provided that cooperates with the deck support arm.

4. The invention of claim 3 wherein at least one gas damper and at least one gas spring cooperate with the transfer conveyor assembly to effectuate transfer.

5. The invention of claim 4 wherein the transfer conveyor assembly includes a stop at the front end to keep the unit load from rolling off of the transfer conveyor assembly upon presentation and transfer of the unit load.

* * * * *